UNITED STATES PATENT OFFICE.

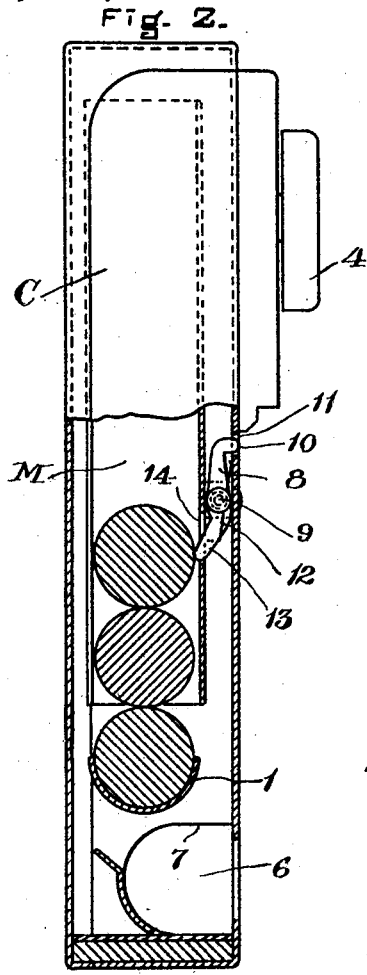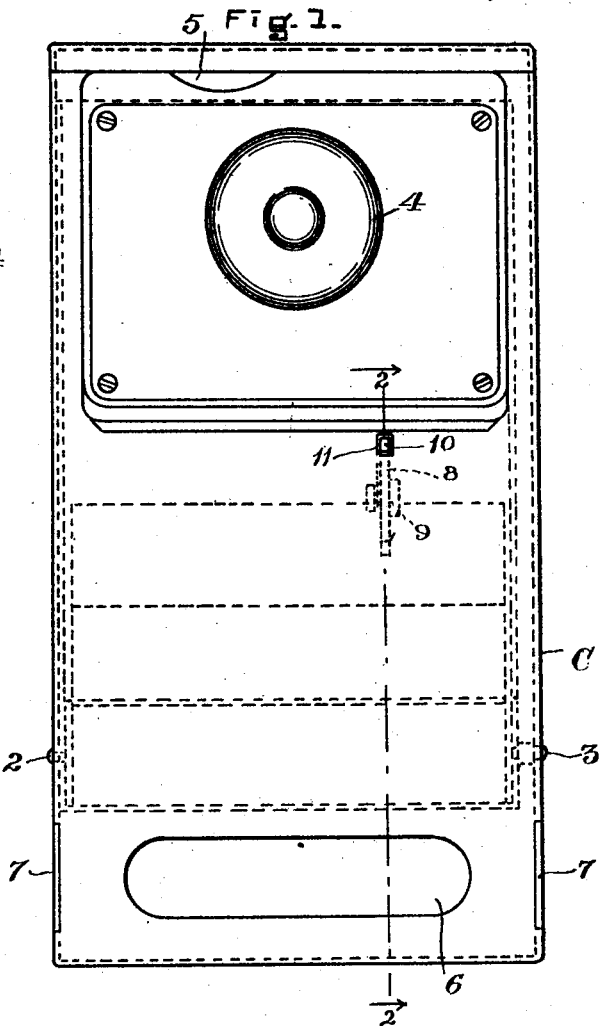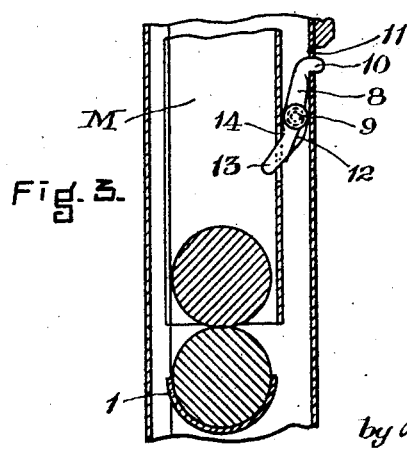

EDWIN B. POTTS, OF JERSEY CITY, NEW JERSEY, AND ALBERT D. GROVER, OF NEW YORK, N. Y., ASSIGNORS TO AUTOSALES CORPORATION, A CORPORATION OF NEW YORK.

VENDING-MACHINE INDICATOR.

1,393,964. Specification of Letters Patent. Patented Oct. 18, 1921.

Application filed November 3, 1917. Serial No. 200,177.

*To all whom it may concern:*

Be it known that we, EDWIN B. POTTS and ALBERT D. GROVER, citizens of the United States, and residents, respectively, of Jersey City, in the county of Hudson, State of New Jersey, and New York, in the county of New York, State of New York, have invented certain new and useful Improvements in Vending-Machine Indicators, of which the following is a specification.

Our invention relates generally to vending machines, commonly called slot machines, and has for its object the provisions of means for indicating the condition of the machines with respect to the supply of goods. The indicator of our invention is such that it may be felt from the outside of the machine, so that the person in charge of the machine can determine at once whether it needs replenishing.

Our invention is particularly applicable to vending machines of the kind that are operated in theaters. In these so-called theater machines it is necessary to attend to several hundred machines in a very short time. It is therefore essential that the collector shall be able to determine vary rapidly whether a machine needs attention. This could not be done if every machine had to be opened, as that would take too long. Nor is it practical to have a sight indicator, such as a strip of glass covering an opening through which the goods may be seen. Such an indicator is objectionable and impracticable for two reasons: in the first place, theaters are dark when collections are made from the vending machines; secondly, the glass of the sight opening would soon be broken and the goods would be tampered with.

Therefore, we have provided a device which the attendant or collector in charge of the machines can feel when passing quickly between the rows of chairs where the machines are attached.

Broadly stated, our invention consists of an indicator within the casing of the machine, adapted to project out of the casing when the supply of goods is in a certain predetermined condition, and to be in withdrawn position when the supply of goods is in another predetermined condition, so that the position of the indicator can be felt by simply passing the fingers over the casing.

In its mechanical embodiment, our invention may assume various forms, but the simplest and most practical form at present known to us, is shown in the accompanying drawings, where—

Figure 1 is a front view in elevation of a vending machine equipped with our invention;

Fig. 2 is a side elevation, partly in section, on line 2—2 of Fig. 1, the indicator being shown in normal position; and Fig. 3 is a detail in section showing the indicator in projected or operative position when the supply of goods in the machine has reached a predetermined condition.

The indicator of our invention is applicable to various kinds of vending machines, and for the sake of illustration we have shown in the drawings a theater machine somewhat like that shown in the application of Anthony Coseglia, Serial No. 186,843, filed August 18, 1917, or the application of Albert D. Grover, Serial No. 187,206, filed August 20, 1917. In this case we have not deemed it necessary to illustrate a complete delivery mechanism, as that does not, in and of itself, form part of our invention. Any suitable mechanism may be employed for delivering the packages.

In the drawings we have shown a delivery cylinder 1 pivoted at 2 and 3 in the sides of the casing C of the machine. This cylinder is adapted to be operated from the hand-knob 4 at the front of the machine when a proper coin is inserted into the coin-slot 5. The operative connections between the knob 4 and the delivery cylinder 1 are not shown in this case, as they form no part of our present invention, but reference may be had to the two applications referred to. For the sake of brevity and convenience, the cylinder 1 will hereinatfer be referred to as the delivery mechanism, by which we mean any suitable form of mechanism of that kind.

The goods or packages to be sold are contained in a magazine M. In the present instance, the lowermost package rests in the delivery cylinder 1. When this cylinder is operated, the lowermost package is discharged into the chamber 6 at the bottom of the casing, whence it may be removed through the side openings 7.

In the particular embodiment of our invention herein set forth, the indicator is shown in the form of a pawl 8 pivoted on the stud 9, which may be conveniently secured either to the front plate of the casing or to the magazine M, or in any other suitable manner. The upper end 10 of the pawl 8 is normally held within the casing C and adapted to project through the opening 11 in the front wall of the casing when the pawl is actuated under the influence of the spring 12. The lower end 13 of the pawl 8 projects through an opening 14 into the magazine and into engagement with the goods, as clearly shown in Fig. 2.

As long as the goods in the magazine hold the lower end of the pawl repressed, the upper or indicating end 10 of the pawl does not project beyond the front plate of the casing and cannot, therefore, be felt from the outside. However, as soon as the supply of goods falls below the lower end of the pawl 8, the spring 12 throws the upper end of the pawl forwardly out of the casing, as shown in Fig. 3. When the pawl 8 is, therefore, in its actuated position, its upper end can be felt by simply passing the fingers across the front plate of the machine. So that, all that the person in charge of the machines has to do to find out whether they need attention, is to pass his hand across the machines as he walks rapidly through the aisles between the rows of chairs. In this way, the collector does not have to stop at each machine, or even look at it, to find out whether it needs replenishing. This makes it possible to attend to a large number of machines in a very short time.

In the form of our invention shown in the drawings, the indicating pawl 8 is operated when there are two or a less number of pieces of goods in the machine. The indicator may, of course, be so arranged as to be operated when a different number of pieces are in the machine, or when the machine is entirely empty. Broadly stated, therefore, the indicator 8 is moved into operative position when the supply of goods reaches a predetermined condition.

It will be noted that the pawl 8 is automatically reset into withdrawn position by the goods themselves. In other words, the mere replenishing of the magazine automatically resets the indicator, and the collector need not, therefore, pay any attention to the same.

Although we have herein set forth a certain specific construction of our invention, we would have it clearly understood that we do not intend to be limited to such construction. It is obvious that the basic idea of our invention—namely, an indicator which can be felt from the outside of the machine when the supply of goods reaches a predetermined condition—may be mechanically carried out in other ways than that shown.

Also, although we have shown and described an indicator which remains in the casing when the machine does not need replenishing, and which projects out of the casing when the supply of goods falls below a predetermined amount, it is evident that the operation of the indicator can be reversed. That is to say, the indicator could be so arranged that it would normally project out of the casing and be actuated into a withdrawn position when the machine needed refilling. In this case, the operator would know that as long as he encountered the projecting end of the indicator, the machine required no attention. The absence of the projecting end would at once inform the attendant that the machine required filling.

Having thus described our invention what we claim as new and desire to secure by Letters Patent in the U. S., is:

1. In a vending machine having an outer casing adapted to contain the vendable goods, a movable device within said casing controlled by the goods, said device being adapted to project out of said casing when the supply of goods is in a certain predetermined condition and to be moved into said casing when the supply of goods is in another predetermined condition, whereby said device acts as an indicator which may readily be felt from the outside of the machine to ascertain the condition of the supply of goods in the casing.

2. In a vending machine having a closed outer casing, an indicator mounted within said casing and adapted to project out of said casing when the supply of goods is in a certain predetermined condition, said indicator being automatically movable into a position within said casing when the supply of goods is in another predetermined condition.

3. In a vending machine, an outer casing provided with a magazine for containing the vendable goods, and a member pivoted within said casing, said member having a part which projects out of said casing when the supply of goods is in a certain predetermined condition, said part being adapted to be moved into said casing when the supply of goods is in another predetermined condition, whereby said part acts as an indicator which may readily be felt from the outside of the casing to ascertain the condition of the supply of goods in the magazine, said member having a second part adapted to engage the goods in the magazine and thereby control the position of said first part.

4. In a vending machine, an outer casing provided with a magazine for containing the vendable goods, a pawl pivoted within said casing, said pawl having an upper end adapted to project automatically out of said casing when the supply of goods reaches a predetermined condition, whereby said upper end acts as an indicator which may readily be felt from the outside of the machine, said pawl having a lower end normally engaging the goods in the magazine to hold said upper end within the casing, and spring means for projecting said upper end out of the casing when said lower end is out of engagement with the goods in the magazine.

5. In a vending machine having an outer casing a movable indicator mounted within said casing and adapted automatically to project out of the casing when the supply of goods is in a predetermined condition, said indicator being automatically reset into normal position by the goods in the magazine.

6. In a vending machine having an outer casing adapted to contain the vendable goods, a movable indicator within said casing having a portion adapted to project out of the casing when the supply of goods is in a certain condition, said indicator being entirely within the casing when the supply of goods is in another predetermined condition.

In witness whereof, we hereunto subscribe our names this 31 day of October, 1917.

EDWIN B. POTTS.
ALBERT D. GROVER.

Witnesses:
JOHN BRANDT,
F. E. LANG.